United States Patent [19]

Dopheide et al.

[11] Patent Number: 4,974,960

[45] Date of Patent: Dec. 4, 1990

[54] LASER DOPPLER ANEMOMETER USING HIGH-FREQUENCY LASER PULSES

[75] Inventors: Dietrich Dopheide; Michael Faber; Guenter Taux, all of Braunschweig; Hans-Joachim Pfeifer, Ruemmingen; Gerhard Reim, Rothemuehle, all of Fed. Rep. of Germany

[73] Assignees: Federal Republic of Germany, represented by the Federal Minister for Economics, Braunschweig, Fed. Rep. of Germany; German-French Research Institute, Saint-Louis, France

[21] Appl. No.: 226,703

[22] Filed: Aug. 1, 1988

[30] Foreign Application Priority Data

Aug. 7, 1987 [EP] European Pat. Off. ........ 87111427.8

[51] Int. Cl.$^5$ .............................................. G01P 3/36
[52] U.S. Cl. .................... 356/28.5; 356/345
[58] Field of Search ..................... 356/5, 28, 28.5, 345

[56] References Cited

U.S. PATENT DOCUMENTS

| 4,036,557 | 7/1977 | Christensen | 356/28 |
| 4,447,149 | 5/1984 | Marcus et al. | 356/5 |
| 4,652,120 | 3/1987 | Sell | 356/28 |

FOREIGN PATENT DOCUMENTS

3435423A1 8/1985 Fed. Rep. of Germany.

Primary Examiner—Thomas H. Tarcza
Assistant Examiner—Linda J. Wallace
Attorney, Agent, or Firm—Foley & Lardner, Schwartz, Jeffery, Schwaab, Mack, Blumenthal & Evans

[57] ABSTRACT

A laser Doppler anemometer with at least two laser beams pass to a region of a fluid flow containing particles. The scattered light is frequency shifted by the Doppler frequency resulting from the flow speed. The construction is very compact and permits a high signal-to-noise ratio for the measurement signals. The laser beams consist of high-frequency pulses, the frequency of the pulse sequence of which is a multiple of the Doppler frequency.

17 Claims, 4 Drawing Sheets

LASER DOPPLER ANEMOMETER USING HIGH-FREQUENCY LASER PULSES

BACKGROUND OF THE INVENTION

The invention relates to a laser Doppler anemometer with at least two laser beams, which are generated by a laser light source and which pass in common to a region of a fluid flow containing particles. Light scattered from the region is measured wherein the frequency of the light is shifted by the Doppler frequency as a result of fluid flow speed.

Such laser Doppler anemometers have been known for a relatively long time. They are employed for the virtually reaction-free measurement of flow speeds of fluids which contain particles. In the region of the flow, the two beams of the laser light source generate a virtual interference pattern, through which the particles of the fluid pass. The frequency of the scattered light produced thereby is shifted by the Doppler frequency in relation to the output frequency of the laser light source.

Continuously radiating laser light sources have customarily been employed for the construction of laser Doppler anemometers (LDA). To the extent that pulsed lasers, e.g., pulsed laser diodes (cf U.S. Pat. No. 4,036,557) have been employed, the pulse duration has been selected so as to be substantially greater than the "transit time", i.e., the time which a particle requires in order to traverse the measurement region.

Continuously radiating lasers which have a high output power for the generation of a good signal-to-noise ratio for the measurement signals are relatively voluminous systems, so that a measurement configuration which is costly and difficult to handle is required. Continuously radiating laser diodes, which have been used for laser anemometry (DE-OS No. 3,435,423), have a relatively weak output power, so that the signal-to-noise ratio of the measurement signals permits the use of the corresponding system, without costly supplementary measures, only for specific fields of application. The same applies, in principle, to the hitherto proposed pulsed laser diodes; in this case, the evaluation of their measurement signals led to considerable problems.

SUMMARY OF THE INVENTION

The object of the invention is to provide a laser Doppler anemometer of the initially mentioned type so that an improved signal-to-noise ratio for the measurement signals is produced, so that further fields of application are also opened up with compact systems.

In a laser Doppler anemometer of the type initially mentioned, this object is achieved, according to the invention, in that the laser beams consist of high-frequency pulses, where the frequency pulses is a multiple of the Doppler frequency.

The difference from the known laser Doppler anemometers involves employing laser beams pulsed with a very high frequency, in which the pulses exhibit a frequency of the pulse sequence which is a multiple of, preferably between five and twenty times, the Doppler frequency, so that the pulse duration is only a small fraction of the "transit time" of the particles.

Some lasers, especially semiconductor lasers, can indeed emit in high-frequency pulsed operation significantly more photons per second than in continuous operation or in operation with long pulses. To the same extent, the signal-to-noise ratio thus increases, according to the invention, in comparison with the continuous operation hitherto employed in the LDA technique or with operation with long laser pulses.

Accordingly, the Doppler measurement signal (virtual interference fringe pattern) is always scanned only for a brief period during the duration of the laser pulses. The Doppler frequency signal can be reconstructed, without further ado, from the amplitude values of the corresponding scattered light pulses and their temporal spacing, which accordingly represent instantaneous values of the Doppler frequency signal.

A simple method for the evaluation of the high-frequency measurement signals involves forming, from the received scattered light pulses, a continuous analog measurement signal in an integrator. Thus, the method of evaluation corresponds to the evaluation of measurement signals which are produced in the case of continuously radiating laser light sources.

In an alternative method of evaluation, which is more advantageous with respect to the measurement signal intensity, the measurement signal is fed to an evaluation device, which includes an amplitude measuring device for the respective scattered light pulses which arithmetically evaluates the measured amplitudes. A device which is particularly suitable for this purpose is an amplitude measuring device which performs the amplitude measurement of the scattered light pulse present at the input in response to a synchronizing pulse. In this case, the synchronizing pulse and the laser pulse are expediently derived from a common high-frequency pulse generator. In the case of the last-mentioned method of evaluation, no intensity losses for the measurement signal arise as on account of the time averaging. Rather, the Doppler measurement signal is determined arithmetically using the instantaneous amplitude measurement values, and its frequency, which gives information on the flow speed.

An exceptionally preferred application of the idea according to the invention arises where laser diodes are used. In a preferred embodiment, the laser light source is thus formed by a laser diode. The laser light source can, of course, also be formed by a plurality of laser diodes.

The high-frequency laser pulses exhibit an extremely short pulse duration, so that the light intensity is considerably increased. As a result of the pulse modulation of the diode, the optical output power can be increased by several factors, also on a time-average basis.

If a plurality of laser light sources are provided for a plurality of speed components and if the plurality of light sources irradiate in each instance phase-shifted pulses, in such a manner that only one laser light source radiates at any point in time, it is possible to measure simultaneously a plurality of speed components of the flow without mutual interaction. In these circumstances, the two or three laser light sources provided for two or three speed components irradiate in each instance a pulse within the pulse interruptions of the other laser light source(s). The evaluation device recognizes the amplitudes of the individual pulses, which belong to a respective speed component, and forms from these the Doppler signal associated with each speed component. Since the emission of the laser light pulses takes place within the pulse interruptions of the other laser light sources for the other speed components, a freedom from reaction between the signals of the various speed components is guaranteed.

This method makes it possible to receive all signals of the various speed components using a single receiving optical system, and to sort them electronically for each component.

BRIEF DESCRIPTION OF THE DRAWINGS

The invention is to be explained in greater detail hereinbelow with reference to illustrative embodiments represented in the drawings. In the drawings.

DETAILED DESCRIPTION OF THE PREFERRED EMBODIMENT

Figure 1:
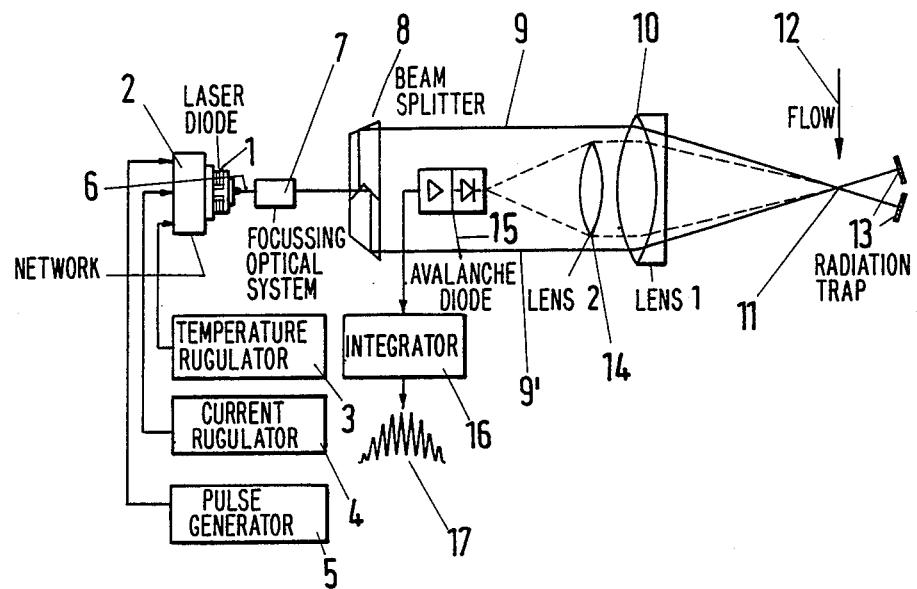
FIG. 1 shows a diagram of the construction of a laser Doppler anemometer having a laser diode as a laser light source and an evaluation device including an integrator.

In the illustrative embodiment represented in FIG. 1, a laser diode 1 is driven by a network 2. In order to regulate the wavelength of the laser diode 1, the network 2 is connected to a temperature regulator 3 and a current regulator 4. The wavelength of the beams emitted by the laser diode 1 is kept constant by the current stabilization and temperature stabilization. To the network 2 there is further connected a pulse generator 5, which causes the laser diode 1 to emit laser pulses having an extremely short pulse duration. The laser beam 6 irradiated by the laser diode 1 is focused by a focusing optical system 7 and subsequently split up, in a beam splitter 8, into two partial beams 9, 9', which run parallel to one another. A collector lens 10 (lens 1) combines the two partial beams 9, 9' in a point spot 11 (volume of intersection), which is situated within the flow 12 of the fluid provided with particles. The partial beams 9, 9' which have passed through the flow 12 are absorbed by a radiation trap 13, in order not to disturb the measurement.

The light scattered, in the illustrative embodiment represented, backwards from the flowing particles is focused by a focusing lens 14 (lens 2), which is disposed in the optical axis of the first lens 10, in such a manner that it falls on a photodetector such as an avalanche diode 15. The electrical signal generated by the avalanche diode 15 passes onto an integrator 16, which forms the measurement signal into a continuous analog LDA signal 17.

The further evaluation takes place in the conventional manner which is known for anemometry using continuously radiating laser light sources.

Figure 2:
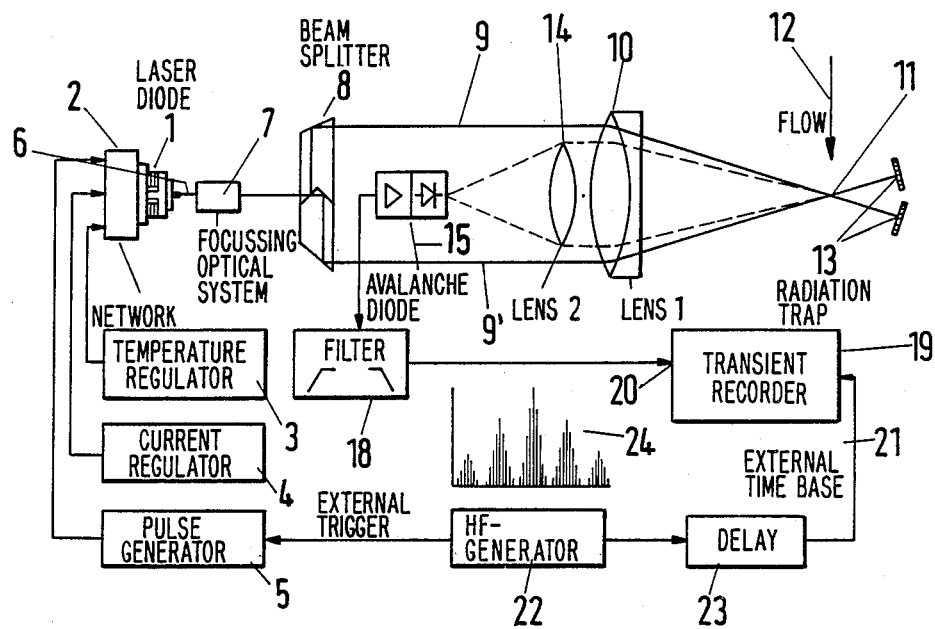
FIG. 2 shows a similar diagram to that shown in FIG. 1 with an amplitude measuring device for the brief scattered light pulses.

The illustrative embodiment represented in FIG. 2 corresponds in all essential parts of the measurement configuration to the above described configuration, so that the same reference numerals have been employed for the same parts. There are differences only as a result of the evaluation device connected to the output of the avalanche diode 15. Output pulses of the avalanche diode 15 pass, via a filter 18 serving to eliminate interference, to a transient recorder 19, which essentially represents a fast analog-digital converter, which measures and digitizes the analog amplitude of the measurement signal present at one of its inputs 20 (signal input), when a trigger pulse is present at an external time base 21. This trigger pulse is generated by a high-frequency generator 22 and passes via a delay circuit 23 to the input of the external time base 21.

The high-frequency generator 22 serves at the same time as generator for trigger pulses for the pulse generator 5, so that the generation of the laser pulses by means of the pulse generator 5 and the generation of the trigger pulses for the transient recorder 19 take place synchronously from the same pulse source, namely the high-frequency generator 22. The delay circuit 23 connected between the high-frequency generator 22 and the transient recorder 19 takes into account the time delay between the emission of the laser pulse by the laser diode 1 and the formation of the measurement pulse at the output of the avalanche diode 15. Hence the trigger pulse is formed at the external time base 21 of the transient recorder 19 in correct phase with the appearance of the measurement pulse at the signal input 20 of the transient recorder 19. A few periods of a Doppler measurement signal 24 are diagrammatically represented in FIG. 2. The Doppler measurement signal 24 is put together by the sequential addition of a plurality (e.g., thirty) of amplitudes of brief measurement pulses and becomes recognizable. Thus, the Doppler measurement signal 24 is scanned pointwise by the laser pulses and determined. As shown in FIG. 2, this determination can take place graphically, but preferably by means of a computer.

In the computer, the signal-to-noise ratio can be further improved by a digital filtering of the measured scattered light pulses. The determination of the Doppler frequency takes place either in the time range by null-point determination or in the frequency range by a Fourier transformation (FFT).

A frequency of the pulse sequence of 10 to 50 MHz with pulse durations of 40 ns to 5 ns is set, for example, for a Doppler frequency of e.g., 2 MHz. The ratio of Doppler frequency and pulse frequency is dependent upon the nature of the signal evaluation and upon the type of laser diode employed. In order to optimize the signal-to-noise ratio, the appropriate operating parameters must be experimentally determined.

Figure 3:
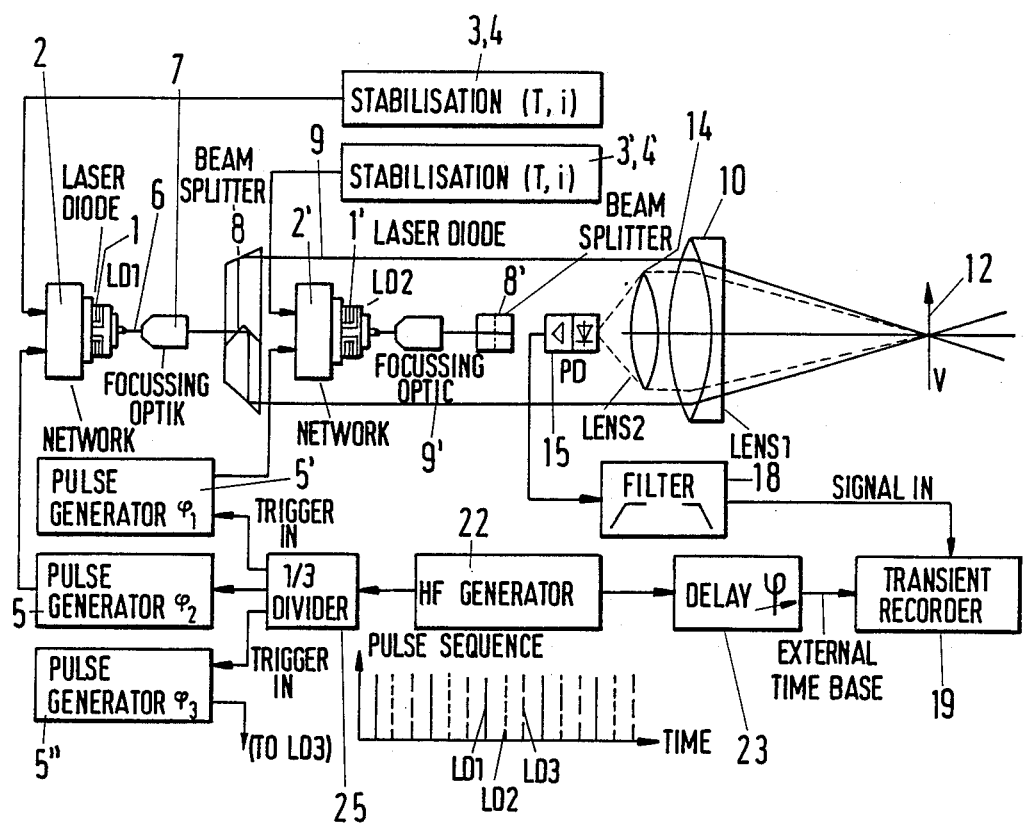
FIG. 3 shows a diagram of the construction of a laser Doppler anemometer according to FIG. 2 having a plurality of laser light sources for a plurality of speed components.

FIG. 3 shows an arrangement which is intended for three laser light sources. Besides a first laser light source 1, a second laser light source 1' is shown, while, for reasons associated with the clarity of representation, a third laser light source is not represented. Although not illustrated, it is understood that the light from beamsplitter 8' is directed to the measuring point of flow 12 via lens 10 and the scattered light is focussed onto diode 15 via focussing lens 10. For the three laser light sources 1, 1' three pulse generators 5, 5', 5" are provided, which are connected to the high-frequency generator 22 via a frequency divider 25. The frequency divider divides by three and triggers the three pulse generators 5, 5', 5" cyclically. Accordingly, the three laser light sources 1, 1', irradiate high-frequency pulses having a frequency which corresponds to one-third of the frequency of the high-frequency generator 22. The duration of the laser light pulses is, in this case, chosen so as to be so small that the laser light pulses of the three laser light sources 1, 1' do not overlap.

A pulse sequence is diagrammatically represented in FIG. 3; in this case, the output pulses of the first laser light source 1 are designated by LD1, those of the second laser light source 1' by LD2 and those of the third laser light source by LD3, and are represented in each instance by solid, dotted and dashed lines.

It is clear that the transient recorder 19 must be triggered with the frequency of the high-frequency generator 22, i.e., with three times the frequency of the pulse sequence frequency of the laser light sources 1, 1'.

Figure 4:
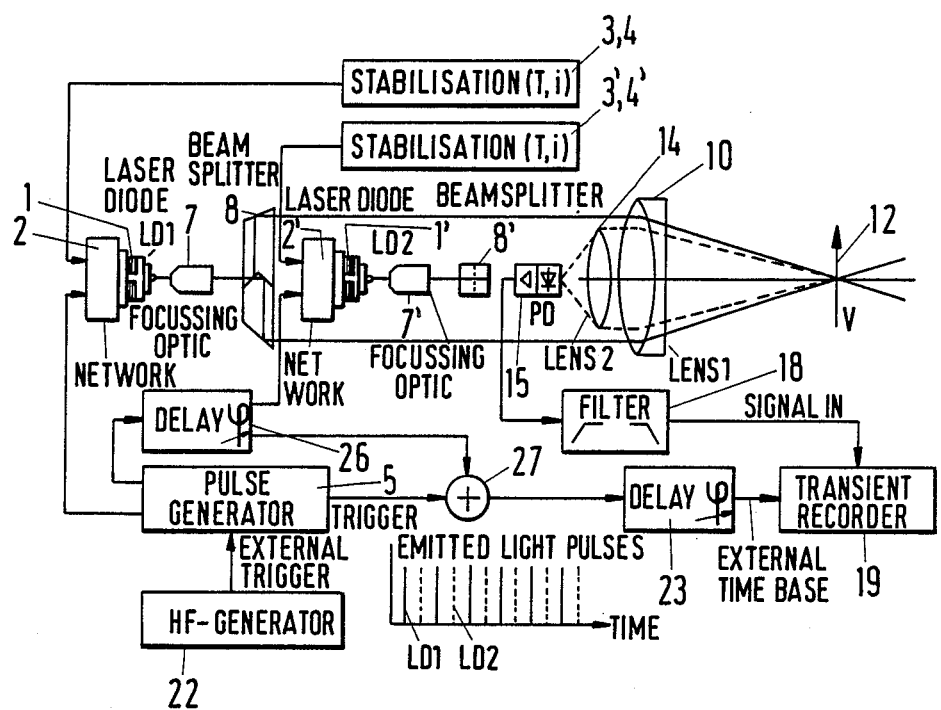
FIG. 4 shows a diagram according to FIG. 3 with a different control of the various laser light sources.

FIG. 4 shows another embodiment for two laser light sources 1, 1', in which the pulse generator 5 generates pulses with the frequency of the high-frequency generator 22. In this case also, it is assumed that the pulse width is substantially smaller than the pulse interruption. The second laser light source 1' is excited to radiate, by means of an adjustable delay circuit 26, at such a temporal spacing in relation to the first laser light source 1 that the laser pulses of the two laser light sources 1, 1' are emitted equidistantly, as is represented diagrammatically in FIG. 4. The output pulses of the first laser light source are shown by solid lines and designated by LD1, while the output pulses of the second laser light source 1' are shown in dashed lines and designated by LD2.

In this case, the transient recorder 19 is triggered by the pulses, which result from summing in an addition circuit 27, pulses output by the pulse generator and the delay circuit 26, i.e., the transient recorder 19 is triggered with twice the frequency of the high-frequency generator 22.

In both of the embodiments represented in FIGS. 3 and 4, the scattered light pulses are received by the common photodiode 15 and evaluated. The amplitude measured by the transient recorder 19 are correlated, by appropriate software, in individual speed components and evaluated with respect to the respective Doppler frequency.

What is claimed is:

1. A laser Doppler anemometer comprising:
   laser light source means for generating leaser light comprised of high-frequency optical pulses with a particular pulse rate;
   means for producing at least two laser beams from said laser light;
   means for directing said laser beams to a region of a fluid flow containing particles, said laser beams being scattered by said particles in said region resulting in scattered light pulses;
   receiving means for receiving said scattered light pulses, a frequency of said scattered light pulses being shifted with respect to a frequency of said laser light by a Doppler frequency corresponding to a fluid flow speed to be measured,
   said particular pulse rate being a multiple of said Doppler frequency.

2. The laser Doppler anemometer as claimed in claim 1, wherein said laser light source means is formed by a laser diode.

3. The laser Doppler anemometer as claimed in claim 1, wherein said receiving means includes integrator means for producing continuous analog measurement signals.

4. The laser Doppler anemometer as claimed in claim 2, wherein said receiving means includes integrator means for producing continuous analog measurement signals.

5. The laser Doppler anemometer as claimed in claim 1, wherein said receiving means includes an evaluation means for measuring amplitudes of said scattered light pulses and for arithmetically evaluating said amplitudes.

6. The laser Doppler anemometer as claimed in claim 2, wherein said receiving means includes an evaluation means for measuring amplitudes of said scattered light pulses and for arithmetically evaluating said amplitudes.

7. The laser Doppler anemometer as claimed in claim 5, wherein said evaluation means measures said amplitudes in response to a synchronizing pulse.

8. The laser Doppler anemometer as claimed in claim 6, wherein said evaluation means measures said amplitudes in response to a synchronizing pulse.

9. The laser Doppler anemometer as claimed in claim 7, wherein said synchronizing pulse and said high-frequency optical pulses are triggered from a common high-frequency pulse generator.

10. The laser Doppler anemometer as claimed in claim 8, wherein said synchronizing pulse and said high-frequency optical pulses are triggered from a common high-frequency pulse generator.

11. The laser Doppler anemometer as claimed in claim 1, wherein said laser light source means is comprised of a plurality of laser light sources, each of said laser light sources outputting a series of optical pulses, each of said series being phase-shifted such that only one of said plurality of laser light sources radiates at any point in time, resulting in said high-frequency optical pulses.

12. The laser Doppler anemometer as claimed in claim 11, wherein each of said plurality of laser light sources is formed by a laser diode.

13. The laser Doppler anemometer as claimed in claim 11, wherein said receiving means includes integrator means for producing continuous analog measurement signals.

14. The laser Doppler anemometer as claimed in claim 11, wherein said receiving means includes an evaluation means, for measuring amplitudes of said scattered light pulses and for arithmetically evaluating said amplitudes.

15. The laser Doppler anemometer as claimed in claim 14, wherein said evaluation means measures said amplitudes in response to a synchronizing pulse.

16. The laser Doppler anemometer as claimed in claim 15, wherein said synchronizing pulse and said high-frequency pulses are triggered from a common high-frequency pulse generator.

17. The laser Doppler anemometer as claimed in claim 11, wherein said receiving means includes a common opto-electronic detector for receiving said scattered light pulses and for converting the same into electrical signals, and means for electronically sorting each speed component in response to said electrical signals.

* * * * *